(12) United States Patent
Wang et al.

(10) Patent No.: US 11,070,976 B2
(45) Date of Patent: **\*Jul. 20, 2021**

(54) OPERATION OF CONTROL PROTOCOL DATA UNITS IN PACKET DATA CONVERGENCE PROTOCOL

(71) Applicant: InterDigital Patent Holdings, Inc., Wilmington, DE (US)

(72) Inventors: Peter S. Wang, E. Setauket, NY (US); Stephen E. Terry, Northport, NY (US); Mohammed Sammour, Alrabieh-Amman (JO)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,870

(22) Filed: Aug. 14, 2019

(65) Prior Publication Data

US 2019/0373455 A1 Dec. 5, 2019

Related U.S. Application Data

(63) Continuation of application No. 15/807,755, filed on Nov. 9, 2017, now Pat. No. 10,405,176, which is a
(Continued)

(51) Int. Cl.
*H04W 12/037* (2021.01)
*H04W 80/02* (2009.01)
(Continued)

(52) U.S. Cl.
CPC .......... *H04W 12/037* (2021.01); *H04W 8/30* (2013.01); *H04W 12/106* (2021.01);
(Continued)

(58) Field of Classification Search
CPC .......... H04L 63/0428; H04W 12/0017; H04W 12/02; H04W 12/10; H04W 12/1006;
(Continued)

(56) References Cited

U.S. PATENT DOCUMENTS 6,909,718 B1 6/2005 Aramaki et al.
8,335,189 B2 12/2012 Wang et al.
(Continued)

FOREIGN PATENT DOCUMENTS

CN 1705308 A 12/2005
CN 1829187 A 9/2006
(Continued)

OTHER PUBLICATIONS

3rd Generation Partnership Project; Technical Specification Group Radio Access Network; Evolved Universal Terrestrial Radio Access (E-UTRA); Packet Data Convergence Protocol (PDCP) specification (Release 8), 3GPP TS 36.323 V8.3.0, Sep. 2008, 25 pages.
(Continued)

*Primary Examiner* — Kan Yuen
(74) *Attorney, Agent, or Firm* — Yin Shao

(57) ABSTRACT

A method and apparatus reports packet data control protocol (PDCP) status and PDCP resets in a wireless communication, using control PDUs that may have security protection applied by ciphering of the control PDUs. Reliability of the PDCP status and reset messages may be assured by acknowledgement according to an acknowledged mode or to an unacknowledged mode.

19 Claims, 7 Drawing Sheets

Related U.S. Application Data continuation of application No. 13/676,366, filed on Nov. 14, 2012, now Pat. No. 9,843,925, which is a continuation of application No. 12/238,810, filed on Sep. 26, 2008, now Pat. No. 8,335,189.

(60) Provisional application No. 60/976,139, filed on Sep. 28, 2007.

(51) Int. Cl.
  *H04W 12/106* (2021.01)
  *H04W 12/108* (2021.01)
  *H04W 8/30* (2009.01)
  *H04L 29/06* (2006.01)

(52) U.S. Cl.
  CPC ......... *H04W 12/108* (2021.01); *H04W 80/02* (2013.01); *H04L 63/0428* (2013.01)

(58) Field of Classification Search
  CPC ............. H04W 12/1008; H04W 36/00; H04W 36/0055; H04W 80/02; H04W 8/30
  See application file for complete search history.

(56) References Cited

U.S. PATENT DOCUMENTS

| | | | |
|---|---|---|---|
| 8,432,888 | B2 | 4/2013 | Sakoda et al. |
| 2002/0199008 | A1 | 12/2002 | Pecen et al. |
| 2003/0007490 | A1 | 1/2003 | Yi et al. |
| 2003/0123485 | A1 | 7/2003 | Yi et al. |
| 2003/0206534 | A1 | 11/2003 | Wu |
| 2004/0033801 | A1 | 2/2004 | Yi et al. |
| 2005/0015703 | A1 | 1/2005 | Terry et al. |
| 2007/0014229 | A1 | 1/2007 | Hepler et al. |
| 2007/0060142 | A1 | 3/2007 | Reznik et al. |
| 2008/0019320 | A1 | 1/2008 | Phan et al. |
| 2008/0064390 | A1 | 3/2008 | Kim |
| 2009/0104890 | A1 | 4/2009 | Wang et al. |
| 2010/0142485 | A1 | 6/2010 | Lee et al. |
| 2011/0205906 | A1* | 8/2011 | Yi .................. H04L 1/1685 370/241 |
| 2011/0263221 | A1 | 10/2011 | Yi et al. |
| 2013/0070714 | A1 | 3/2013 | Chun et al. |

FOREIGN PATENT DOCUMENTS

| | | |
|---|---|---|
| CN | 1964288 A | 5/2007 |
| CN | 101030840 A | 9/2007 |
| JP | H03237829 | 10/1991 |
| JP | 2000324161 A | 11/2000 |
| JP | 2007053588 A | 3/2007 |
| RU | 2285349 | 10/2006 |
| RU | 2313912 | 12/2007 |
| TW | 200642368 | 12/2006 |
| WO | WO 2006116620 A2 | 11/2006 |
| WO | WO 2006118418 A2 | 11/2006 |

OTHER PUBLICATIONS

LG Electronics Inc.,Activation and change of security, 3GPP Tdoc R2-073045; 3GPP TSG-RAN WG2 Meeting #59, Athens, Greece, Aug. 19-24, 2007, 5 pages.
Ericsson,User Plane Status Reports in LTE, 3GPP Tdoc R2-073225; TSG-RAN WG2 Meeting #59, Athens, Greece, Aug. 20-24, 2007, 2 pages.
Patent Abstract of Japan, Japanese Publication No. 2007-053588, Mar. 1, 2007, 1 page.
Rapporteur,Open Issues for PDCP Specifications, Discussion and Decision, 3GPP Tdoc R2-07xxxx, 3GPP TSG-Ran WG2 Meeting #59, Athens, Greece, Aug. 20-24, 2007.
Samsung,PDCP/RLC/MAC header format, 3GPP Tdoc R2-070548; 3GPP TSG-RAN2 Meeting #57, St. Louis, US, Feb. 12-16, 2007, 3 pages.
LG Electronics Inc.,Security de-synchronization, 3GPP Tdoc R2-073258, 3GPP TSG-RAN WG2 Meeting #59, Athens, Greece, Aug. 20-24, 2007, 2 pages.
Japanese Official Notice of Rejection (English Translation), Japanese Application No. 2016-060632, dated Feb. 14, 2017, 6 pages.
Patent Abstract, Chinese Publication No. 1705308, Dec. 7, 2005, 1 page.
Japanese Notice of Allowance (English Translation), Japanese Application No. 2012-232928, dated Aug. 2, 2016, 3 pages.
Nokia Et Al.,Handover Command and UE behaviour, 3GPP Tdoc R2-073075, 3GPP TSG-RAN WG2 Meeting #59, Athens, Greece, Aug. 20-24, 2007, 2 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.1.0, Jun. 2007, 106 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.6.0, Sep. 2008, 137 pages.
3rd Generation Partnership Project; Technical Specification Group Radio Access Network; Evolved Universal Terrestrial Radio Access (E-UTRA) Radio Resource Control (RRC); Protocol specification (Release 8), 3GPP TS 36.331 V8.3.0, Sep. 2008, 178 pages.
Alcatel-Lucent,Security configuration over RRC or PDCP, 3GPP Tdoc R2-073467; 3GPP TSG-RAN WG2 Meeting #59, Athens, Greece, Aug. 20-24, 2007, 3 pages.
Japanese Notice of Allowance, Japanese Application No. 2012-232928, dated Aug. 2, 2016, 3 pages.
Chinese Office Action, Chinese Application No. 201410548780.3, dated Mar. 29, 2017, 5 pages.
Ericsson,RLC Status PDU Format, 3GPP Tdoc R2-99255; 3GPP Tdoc TSGR2#3(99)225, TSG-RAN Working Group 2 (Radio layer2 and Radio layer 3), Yokohama, Apr. 13-16, 1999, 5 pages.
3rd Generation Partnership Project; Technical Specification Group Radio Access Network; Evolved Universal Terrestrial Radio Access (E-UTRA) Packet Data Convergence Protocol (PDCP) specification (Release 8), 3GPP TS 36.323 V1.0.0, Sep. 2007, 19 pages.
Japanese Official Notice of Rejection, Japanese Application No. 2016-060362, dated Feb. 14, 2017, 5 pages.
Patent Abstract, Chinese Publication No. 1829187, Sep. 6, 2006, 1 page.
Patent Abstract of Japan, Japanese Publication No. H03-237829, Oct. 23, 1991, 1 page.
Chinese Office Action (English Translation), Chinese Application No. 201410548780.3, dated Mar. 29, 2017, 7 pages.

* cited by examiner

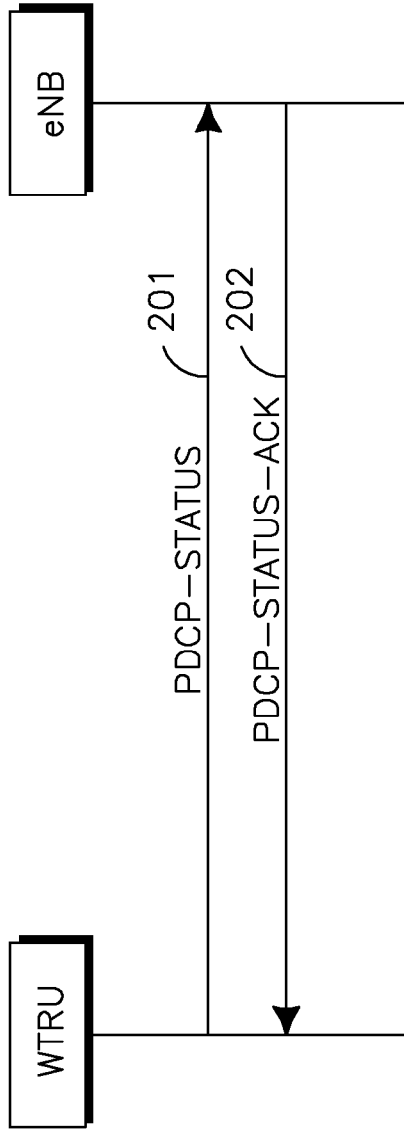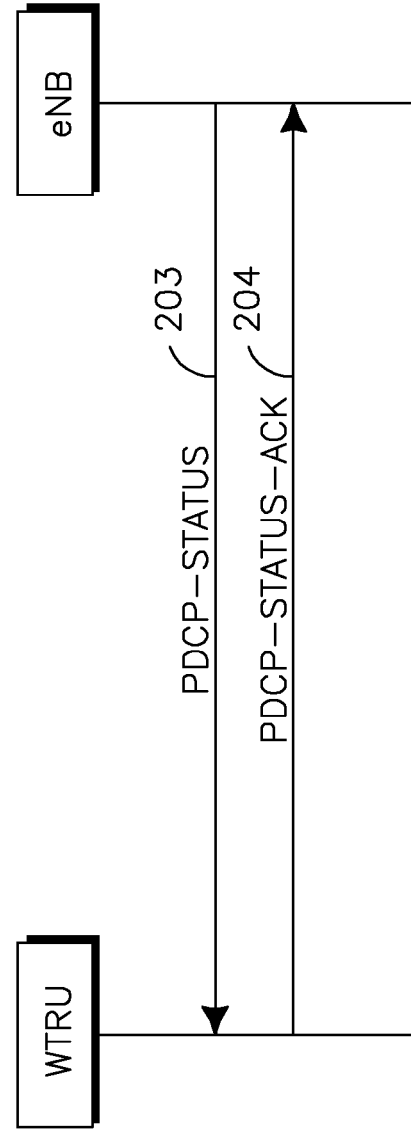

OPERATION OF CONTROL PROTOCOL DATA UNITS IN PACKET DATA CONVERGENCE PROTOCOL

CROSS REFERENCE TO RELATED APPLICATIONS

This application is a Continuation of U.S. patent application Ser. No. 15/807,755 filed on Nov. 9, 2017, which is a Continuation of U.S. patent application Ser. No. 13/676,366 filed on Nov. 14, 2012, now U.S. Pat. No. 9,843,925, which is a Continuation of U.S. patent application Ser. No. 12/238,810 filed on Sep. 26, 2008, now U.S. Pat. No. 8,335,189, which claims the benefit of U.S. Provisional Patent Application No. 60/976,139 filed on Sep. 28, 2007, the contents of each of which being incorporated by reference as if fully set forth herein.

FIELD OF INVENTION

The present invention is related to wireless communications.

BACKGROUND

Current effort for the Third Generation Partnership Project (3GPP) Long Term Evolution (LTE) program is to bring new technology, new architecture and new methods in the new LTE settings and configurations in order to provide improved spectral efficiency, reduced latency, better utilizing the radio resource to bring faster user experiences and richer applications and services with less cost.

LTE packet data convergence protocol (PDCP) is now responsible for ciphering, integrity protection and PDCP service data unit (SDU) sequence number (SN) maintenance. While PDCP Data protocol data units (PDUs) are ciphered, LTE specifications do not allow for ciphering and integrity protection of PDCP Control PDUs.

Peer PDCP entities can exchange PDCP-STATUS messages, for instance during a handover. A PDCP-STATUS message indicates whether or not one or more PDCP SDUs has been received by the receiving PDCP entity (i.e. it provides positive or negative acknowledgements for PDCP SDU SN(s)). A PDCP-STATUS message may be sent using a PDCP Control PDU.

PDCP operations have already evolved beyond the previous Universal Mobile Telecommunication Systems (UMTS) realm. As a result, PDCP Control PDUs are available to assist special operations as well as to regulate the normal operation management tasks. To this end, the PDCP Control PDU operations need to be defined and standardized in order to coordinate the actions between the peer PDCP entities.

SUMMARY

A method and apparatus report packet data control protocol (PDCP) status and PDCP resets in a wireless communication, using control PDUs that may be have security protection applied by ciphering of the control PDUs. Reliability of the PDCP status and reset messages may be assured by acknowledgment according to an acknowledged mode or an unacknowledged mode.

BRIEF DESCRIPTION OF THE DRAWINGS

A more detailed understanding may be had from the following description, given by way of example in conjunction with the accompanying drawings wherein:

FIGS. 2A and 2B show signaling diagrams for uplink and downlink protocol status messages, respectively, and corresponding status acknowledgement messages;

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

In the present embodiment, PDCP Control PDUs are ciphered at the PDCP layer whether in the user plane (U-plane) or control plane (C-plane). Types of PDCP Control PDUs for ciphering include, but are not limited to PDCP STATUS messages and PDCP RESET messages. Robust Header Compression (RoHC) feedback packets may be excluded from the ciphering.

Figure 1:
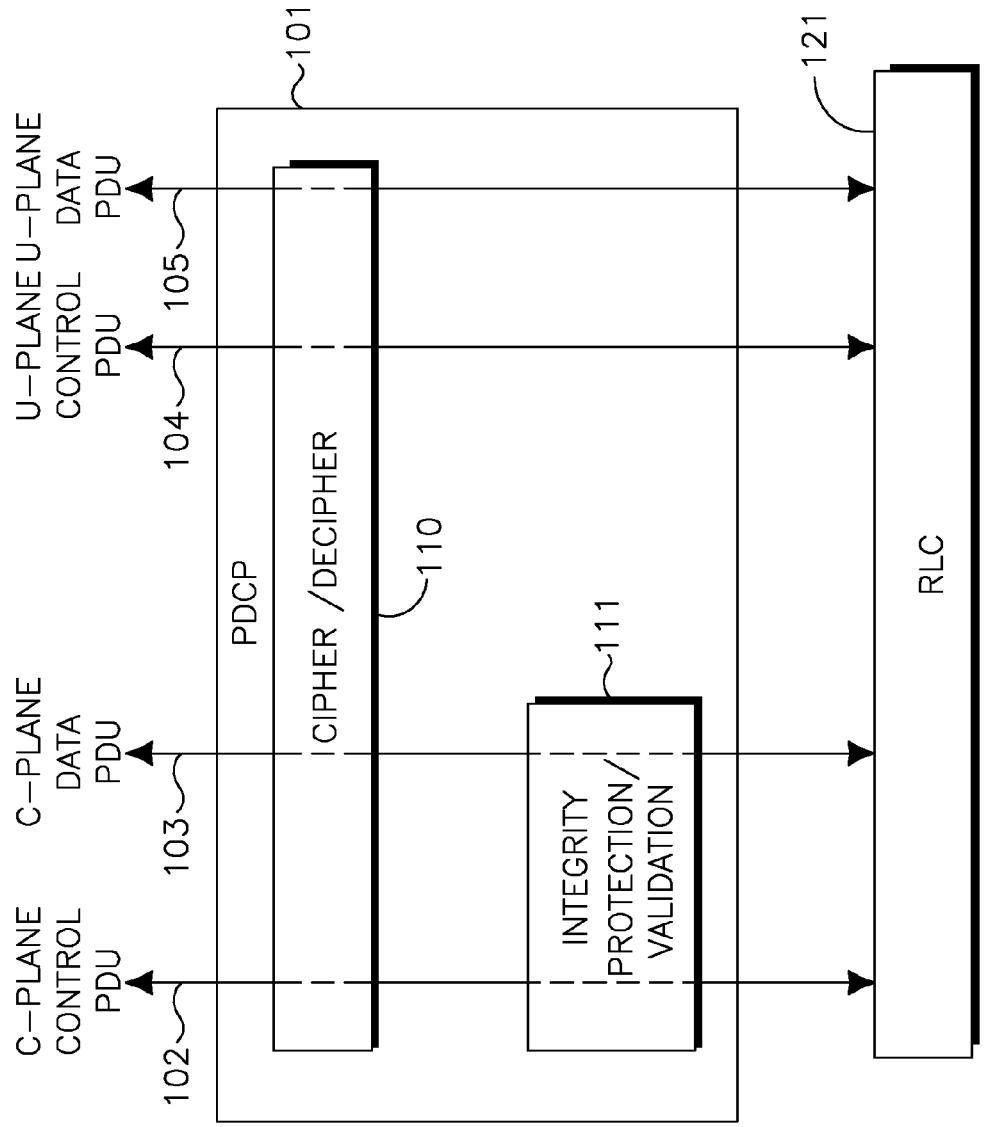
FIG. 1 shows block diagram of a PDCP layer with ciphering and integrity protection functional entities.

FIG. 1 shows a block diagram of a PDCP layer 101, processing C-plane PDCP Control PDUs 102, C-plane PDCP Data PDUs 103, U-plane PDCP Control PDUs 104, and U-plane PDCP Data PDUs 105. A ciphering/deciphering entity 110 is used to cipher PDCP PDU transmissions and decipher PDCP PDU receptions. The ciphering/deciphering entity 110 may use the same cipher key, ciphering algorithm, and input parameters for the C-plane PDCP Control PDUs 102 as used for the C-plane PDCP Data PDUs 103. Similarly, the U-plane PDCP Control PDUs 104 may have the same cipher key, ciphering algorithm, and input parameters applied by the ciphering/deciphering entity 110 as for the U-plane PDCP Data PDUs 105.

One possible exception of this sharing includes a ciphering sequence COUNT. The COUNT value includes a first field having a hyper-frame number (HFN) and a second field having a PDCP sequence number (SN), where the SN for the U-plane PDCP Control PDUs 104 may be a unique sequence compared to that for the U-plane PDCP Data PDUs 105. Consequently, for a unique SN, the COUNT sequence of the PDCP Control PDU 104 would be different than the COUNT sequence of the PDCP Data PDU 105.

With respect to maintenance of PDCP SNs, the U-plane PDCP Control PDUs 104 may have a dedicated PDCP SN domain per radio bearer. The U-plane PDCP Control PDUs 104 may also have a dedicated HFN or the most significant bits (MSBs) for the COUNT value construction. The HFN or MSBs of the COUNT value of the PDCP Control PDU may be initialized mutually in the WTRU and the evolved UMTS terrestrial radio access network (E-UTRAN). A predefined initialization rule may be applied to a stored HFN seed value in a UMTS subscriber identity module (USIM) in the WTRU. The HFN seed value is taken from running HFNs and saved in the USIM upon powering down of the WTRU. When the WTRU powers on again, this stored HFN seed value is taken out to re-initialize the HFNs. This stored HFN seed value for the PDCP Control PDUs could be the same or different from the stored value used for PDCP Data PDUs. For example, the same stored value could be used with a different initialization rule then being applied to the stored value for the PDCP Control PDU:

$$HFN = START + OFFSET_{PDCP\ Control\ PDU} \quad \text{Equation (1)}$$

where START is the stored HFN seed value common to both the PDCP Control PDU and the PDCP Data PDU.

Alternatively, the HFN or MSBs of the COUNT value of a U-plane PDCP Control PDU 104 may be set to zero, or configured by the E-UTRAN as part of the PDCP configuration or Security Command Mode setup. Incrementation of the HFN or MSBs of the COUNT value may be fixed, or applied at the PDU sequence number value wrap-around. As an example of a wrap-around incrementation, consider a 10-bit COUNT value, with a 5-bit HFN field concatenated with a 5-bit SN field, both initialized to zero. The SN increments with every sent/received PDU, at values from 0 to 1, 2, . . . , 31. With another PDU, the SN returns to 0, thus at a 'wrap-around', and the HFN is incremented by one, as a binary carry.

Returning to FIG. 1, the PDCP layer 101 includes integrity protection/verification entity 111, which processes C-plane PDCP Control PDUs 102 according to the same methods used for C-plane PDCP Data PDUs 103. During transmission of the C-plane Control PDUs 102, the integrity protection entity 111 takes the PDU data bit stream as input, together with other inputs such as the security key, the COUNT value of that PDU, and generates a coded word, referred to as a message authentication code (MAC-I), sent together with the PDU proper. When receiving the C-plane Control PDUs 102, the integrity protection/verification entity 111 performs verification of the PDUs on the MAC-I.

According to a second embodiment, PDCP-STATUS PDUs are exchanged in a message between a WTRU and the E-UTRAN. A PDCP-STATUS message is exchanged between the WTRU and an E-UTRAN entity (e.g., an enhanced Node-B (eNB)) over a common radio bearer. Various signaling parameters for a PDCP-STATUS message may be organized into an LTE information element (IE) and be carried by an RRC message. Such parameters include the following.

A parameter for PDCP reordering purposes may be defined by an initial PDCP-SN and the range of the PDCP reordering window. The resulting PDCP SNs may be used at a handover of the WTRU between enhanced Node-Bs (eNBs), i.e., an inter-eNB handover.

A parameter for general PDCP transmission and retransmission regulation may be defined by an Acknowledgement (ACK) or negative acknowledgement (NACK) of PDCP SDUs with their PDCP-SNs. The ACK/NACK may indicate PDCP-SDUs selectively for a number N of consecutive packets, with a starting SN number and subsequent bitmap with each bit for the status of one SDU (i.e. a PDCP-SN). In the bitmap, the bit value and its semantics could be consistent with the ACK/NACK attribute in the IE or the bit value in the map may instead have its own independent representation. In the latter case, the attribute ACK/NACK is not needed. For example, an IE containing [NACK, 323, 101001110] is definitive of negative acknowledgement of SDU packets with SNs 323, 324, 326, 329, 330, 331. Here, a bit value '1' represents a NACK. The bitmap does not include the starting SDU 323 since it is already explicitly expressed in the IE. Instead, the bitmap commences at the next SDU 324 up to SDU 332. Thus, the NACKed SDUs including the starting one are 323, 324 (the first bit and set), 326 (the third bit and set), 329, 330, 331 (the sixth, the seventh and the eighth bits and set. The other SDUs are not NACKed. As another example, an IE containing [323, 101001110] represents SDUs with SN 323, 325, 327, 328 and 332 are missing, since a bit value '0' is an indication for an SDU not correctly received and needing retransmission. Alternatively, the ACK/NACK may indicate the PDCP SDUs cumulatively for one homogeneous status (i.e., all ACK or all NACK), with a starting SN number and the range for the consecutive SDU SNs. For example, an IE containing [ACK, 256, 6] represents acknowledgement that packets were received for SDU SNs 256, 257, 258, 259, 260, 261.

Figure 7:
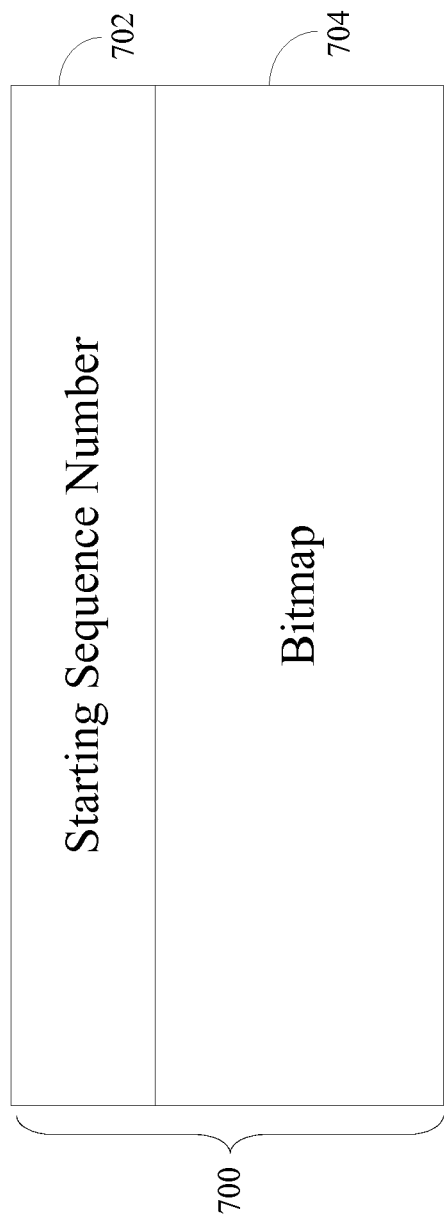
FIG. 7 illustrates an example PDCP-STATUS message.

FIG. 7 illustrates an example PDCP-STATUS message. As shown in FIG. 7, PDCP-STATUS Message 700 may include Starting Sequence Number 702 and Bitmap 704. Starting Sequence Number 702 may be the sequence number of a PDCP SDU that has not been successfully received. Bitmap 704 may indicate whether PDCP SDUs with sequence numbers that are subsequent to Starting Sequence Number 702 have been successfully received. For example, if Starting Sequence Number 702 is 323, Bitmap 704 may indicate whether sequence numbers 324, 325, 326, . . . , $SN_N$ have been successfully received (where $SN_N$ may be the last sequence number with a corresponding bit in Bitmap 704).

An information parameter may be defined to control general PDCP transmission/retransmission window operations or receive window operations and their synchronizations. This includes sliding the window or changing the window range, which may occur when reordering PDCP packets at handover. This parameter may be defined as a window range with a starting SN number, either low end or trailing end, and a range for the remaining SDU SNs. For example, an IE containing [256, 16] can be used to represent the SDU SN window [256, 257, 258, . . . , 271].

The PDCP-STATUS PDUs may also include parameters for general PDCP security regulation, which may be defined to inform the peer PDCP entity about LTE security parameter changes occurring at the PDCP layer. Here, the PDCP-STATUS PDU is used to indicate the current HFN or MSB of a ciphering sequence COUNT value that is used for each relevant radio bearer (RB). For example, an IE may be defined to include an RB-ID and its current downlink HFN or MSB of the COUNT value and/or uplink HFN or MSB of the COUNT value. Specifically, an IE containing [5 and 452/423] can be used to indicate that a downlink HFN 452 and an uplink HFN 423 for RB-ID 5 need to be reset to at the reception of the STATUS PDU.

The PDCP-STATUS PDUs can also be used to regulate PDCP SDU transmission/retransmission and manage SDU buffer spaces.

The PDCP-STATUS PDUs may also carry parameters to inform, check and possibly change LTE security operations performed at the PDCP level if the relevant IE is included in the transmitted PDCP-Status PDU. The presence of such an IE in the message indicates a reset of the HFNs for a particular RB.

FIGS. 2A and 2B show signaling diagrams for the PDCP-STATUS message PDUs. In FIG. 2A, the WTRU sends a PDCP-STATUS message 201 to the eNB. For reliability control, the WTRU receives a PDCP-STATUS ACK signal 202 from the eNB to acknowledge that the PDCP-STATUS message was safely received at the eNB. In FIG. 2B, the eNB sends a PDCP-STATUS message 203 to the WTRU. For reliability control, the eNB receives a PDCP-STATUS ACK signal 204 from the WTRU to acknowledge that the PDCP-STATUS message was safely received at the WTRU. The PDCP-STATUS-ACK message 202, 204 could either be a dedicated acknowledgement message or be a message that also contains all other possible PDCP-STATUS parameters. Alternatively, an acknowledgment could be received as an indication (acknowledgement on a PDCP-SN or a shorter transaction-Id) in a PDCP-STATUS message.

Figure 3A:
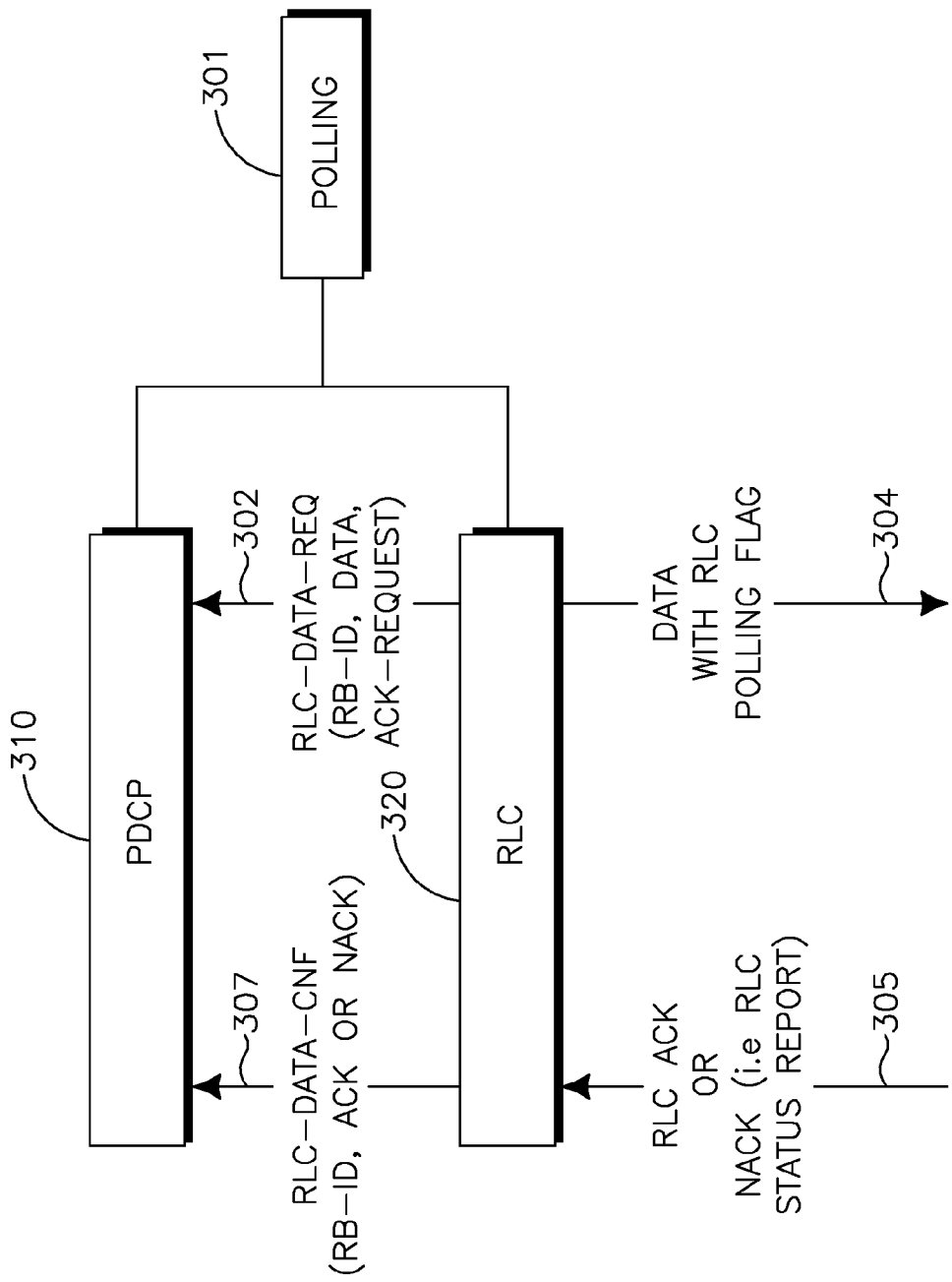
FIGS. 3A and 3B show a PDCP/RLC inter-layer polling mechanism used for a PDCP-STATUS message reliability check.

Alternatively, the PDCP-STATUS signaling may be performed without requiring a PDCP-STATUS ACK signal. The reliability of PDCP-STATUS message 201, 203 can still be ensured as follows. If radio link control acknowledged mode (RLC-AM) is the link mode, the WTRU or eNB can internally check its radio link control (RLC) status. Alternatively, for all RLC link modes, the WTRU can check a hybrid automatic repeat request status (HARQ-status) through the RLC layer, using an internal PDCP/RLC inter-layer polling mechanism. FIG. 3A shows an example for the RLC-AM link mode, where a PDCP layer 310 interfaces with an AM RLC layer 320. A PDCP/RLC inter-layer polling mechanism 301 performs an internal reliability status check of the RLC layer 320 by setting a polling signal RLC-DATA-REQ 302, which may include an RB-ID, a data field and an acknowledgment request, sent from the PDCP layer 310 to the RLC layer 320. The RLC 320 sets one or more bits of a polling flag 304 on the RLC data PDU(s) carrying the PDCP-STATUS message, and receives an RLC status report 305 (i.e., an RLC ACK/NACK report). The PDCP layer 310 receives the acknowledgment signal RLC-DATA-CNF 307 from the RLC 320, indicating the RB-ID and the ACK/NACK.

Figure 3B:
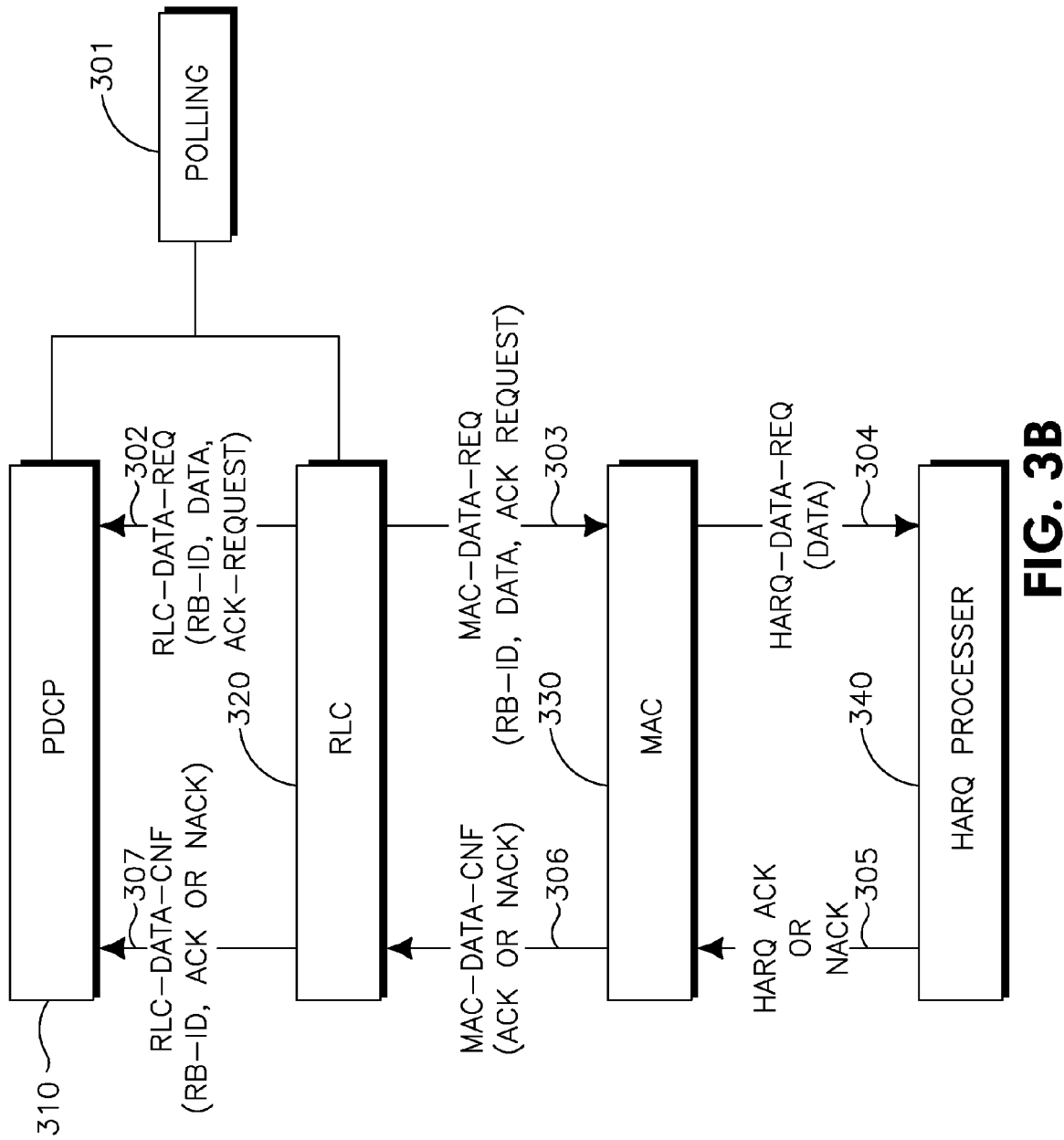

FIG. 3B shows an example of PDCP status signaling for unacknowledged mode (UM) RLC entities. A PDCP/RLC inter-layer polling mechanism 301 performs an internal reliability status check to the RLC 320 and in turn to a MAC 330 for aHARQ 340 processor status. A polling signal RLC-DATA-REQ 302 is set by the polling mechanism 301, and sent by PDCP 310 to the RLC 320, which forwards the polling as signal MAC-DATA-REQ 303. These polling signals 302, 303 include the RB-ID, a data field and an acknowledge request. The MAC 330 sends a signal HARQ-DATA-REQ 304, as data to the HARQ processor 340. The HARQ processor 340 status is returned to the PDCP 310 via a HARQ ACK/NACK signal 305, a MAC-DATA-CNF signal 306 as an ACK/NACK, and a RLC-DATA-CNF signal 307 with the ACK/NACK and the RB-ID. While the above example implementations are described with reference to a WTRU, the signaling according to FIGS. 3A and 3B could be applied to similar respective entities in an eNB implementation.

The PDCP-STATUS message 201, 203 shown in FIGS. 2A, 2B may be triggered by any of the following triggers.

Figure 4:
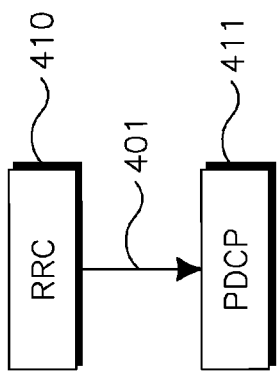
FIG. 4 shows an RRC primitive to trigger a PDCP-STATUS message.

At a handover of the WTRU, a radio resource control (RRC) handover command or handover confirm signal or an RLC Reset indication may trigger a PDCP-STATUS message 201, 203. This also includes a new handover occurring while an existing handover PDCP procedure is ongoing. As shown in FIG. 4, a primitive or signal or indication 401 from an RRC entity 410 to a PDCP entity 411 of the WTRU or eNB can convey/trigger the generation of the PDCP-STATUS message.

In the case that a PDCP-STATUS message can also be used beyond handover management for regular operations control, then the triggering source of the PDCP-STATUS message transmission may include any one or combination of the following. A periodic PDCP-STATUS message from a PDCP entity receiver function may be used, such as a RRC configured and timer based message. The trigger may be an event based PDCP-STATUS message, and also RRC configured (e.g., when the window has advanced n=200 SDUs) from either a transmit or receive function of a PDCP entity. The trigger may occur after a certain timeout period, such as a PDCP uplink retransmission failure. Other triggers include an RLC reset or re-establishment, an RRC handover or other RRC events, and PDCP events.

Figure 5:
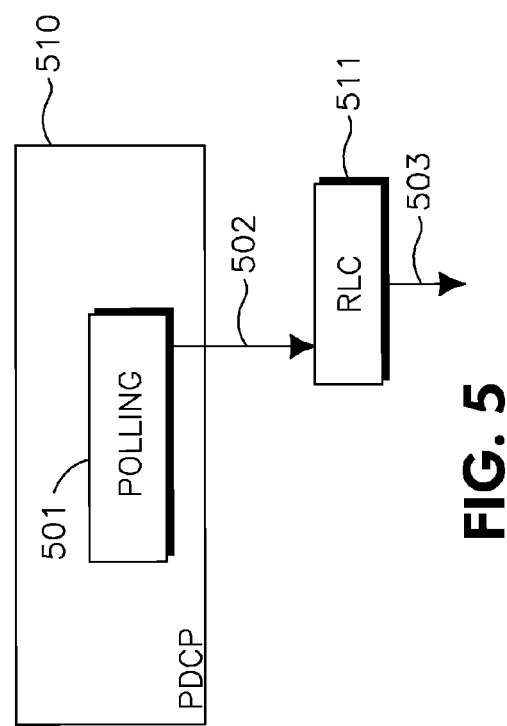
FIG. 5 shows a PDCP Polling mechanism for triggering a PDCP-STATUS message.

FIG. 5 shows an example of another possible trigger, which is a reception of a poll signal from the peer PDCP entity. A PDCP-STATUS polling mechanism 501 is included in a PDCP layer 510, such that the transmitting PDCP entity can poll the receiving PDCP entity for its PDCP status by sending a poll signal 502 to the RLC layer 511, and then on to the lower layers as poll signal 503 for transmission. The PDCP polling mechanism 501 may utilize a polling bit in the PDCP header of a PDCP PDU, or it may utilize a PDCP Control PDU to be used for polling (e.g., a Control PDU type defined for polling). When the receiving PDCP entity receives a packet where the 'polling bit' is set, or a PDCP Control PDU that has the polling type, the generation of PDCP-STATUS PDU is triggered.

According to a third embodiment, a PDCP-RESET message is sent as a peer-to-peer message between PDCP entities of the WTRU and the eNB over a common radio bearer. The PDCP-RESET message is used to inform or command the peer entity (WTRU/eNB) that a full or a partial PDCP reset has occurred or needs to occur. The term 'PDCP reset' is interchangeable herein with a PDCP re-establishment. In order to distinguish whether the PDCP-RESET is a command or an information signal, a indicator bit can be defined and transmitted for such a purpose. For example, such an indicator bit can be set to 0 as an indication that the PDCP "has reset" and set to '1' to indicate a command "to reset" the PDCP. Additionally, for the reset command, a timestamp or a frame number to synchronize the RESET peer action, may be included with the PDCP-RESET message. Alternatively, the distinction between an informative reset and a reset command could be implied from the context (i.e. if the WTRU sends it, then the WTRU is informing the eNB that the WTRU PDCP was reset; if the eNB sends it, then eNB is commanding the WTRU to perform a PDCP reset. It should be noted, however, that whichever peer entity performs a PDCP reset or re-establishment, the counterpart peer entity will also reset or re-establish its PDCP entity as well.

The PDCP reset or re-establishment may be triggered by any one or combination of the following: an unrecoverable PDCP operation error (e.g., a buffer error); a timeout on an unexpected PDCP-STATUS message acknowledgement; an unrecoverable PDCP security error detected by either peer entity; a handover event for LTE non-lossless radio bearer(s), in which case, the COUNT is reset to zero; an error on a new handover while an old handover procedure has not yet been completed; an unrecoverable error in the header compression function and operation; an upper layer intervention or command, such as from the RRC layer on the C-plane or from the non-access stratum (NAS) on the U-plane, which requires a reset of the corresponding PDCP entity; and a lower layer indication from the RLC layer that requires a corresponding PDCP entity reset. In the case of the unrecoverable security error, it can be detected by integrity protection on the C-plane and header decompression on the U-plane, in which case the PDCP-RESET message could be used between the WTRU and eNB for resetting the de-synchronized security parameters. Other triggers include: a PDCP security error detected by integrity protection error; a handover error; an indication from an RRC layer which requires a reset or re-establishment of a PDCP entity; and/or an indication from an RLC layer which requires a reset or re-establishment of a PDCP entity.

For a full PDCP reset, all of the following function operations of the PDCP entity of the WTRU or eNB may be changed to a pre-defined state or operating values (i.e., reset/re-established), which could occur at a certain PDCP-SN or at an absolute time mark, such as a system frame number (SFN) or a full or modified standard time representation (e.g., international GMT) or by the time of the reception of the message:

- a header compression entity and operation state are reset to the initial state and a full header (IP/TCP or IP/UDP/RTP or IP/xxxx) will be transmitted and expected to be received after the reset per the header compression algorithm;
- security operations or security parameters are reset to any of the following: last configured values; initialized security parameter values; or a certain past setting/configuration values indexed by a parameter in the RESET message; examples of security parameters being reset include the security keys, the HFN or MSB values of the COUNT parameter, or the FRESH value in integrity protection;
- a PDCP-SN reset is honored only from the E-UTRAN to the LTE WTRU and the PDCP-SN is either to be reset to a specified value (e.g., an offset) or to zero. The PDCP-SN on each radio bearer may or may not be reset; and
- PDCP reordering parameters for in-sequence-delivery or duplication detection operations are reset.

For a partial PDCP reset, less than all of the above described functions or operations are reset/re-established at the PDCP entity of the WTRU or eNB.

Figure 6A:
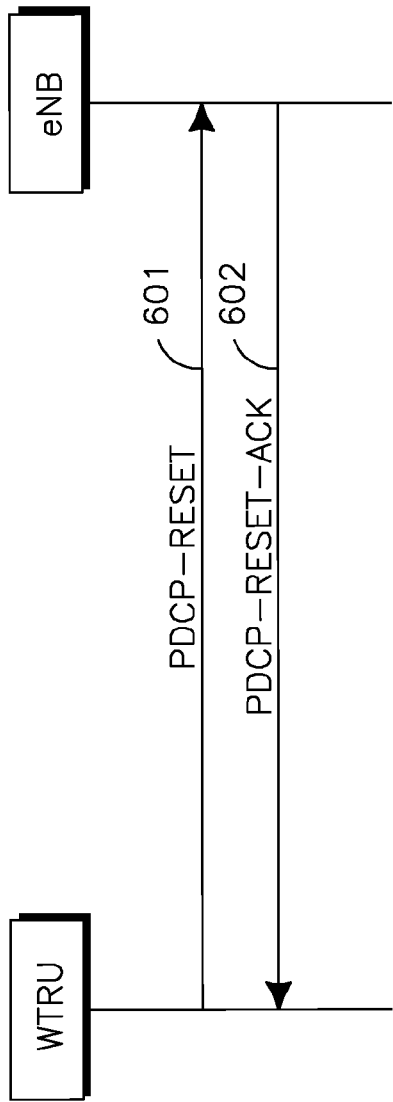
FIGS. 6A and 6B show signaling diagrams for uplink and downlink protocol reset messages, respectively, and corresponding reset acknowledgement messages.
Figure 6B:
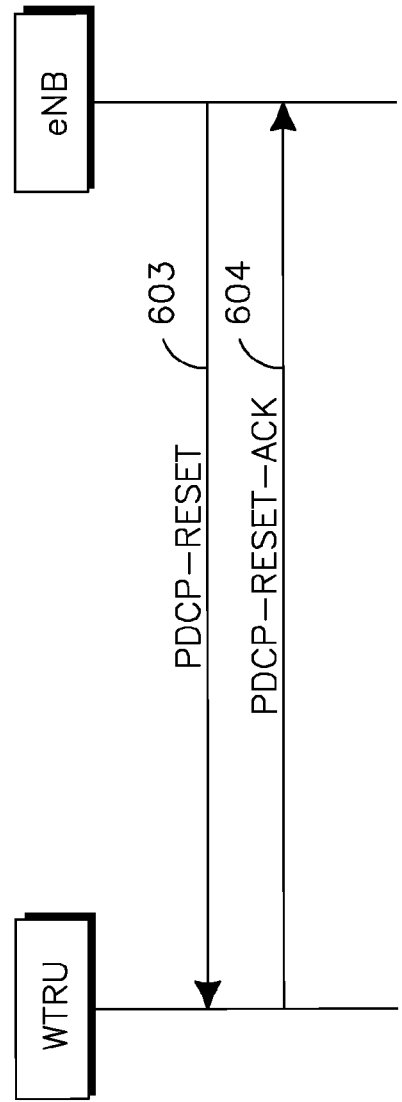

FIG. 6A shows a signaling diagram of a WTRU sending a PDCP-RESET message 601 to an eNB to command its peer PDCP entity in the eNB to reset, or to inform the eNB that the WTRU PDCP has performed a full or partial reset. For a PDCP-RESET command message 601, an explicit PDCP-RESET-ACK message 602 is returned to the WTRU after the PDCP reset at the eNB is completed. This acknowledgment message 602 is not mandatory if the PDCP-RESET message 601 was not a reset command. FIG. 6B shows the reverse scenario, in which the eNB sends a PDCP-RESET message 603 to the WTRU. If the PDCP-RESET message 603 is a command, the WTRU sends an explicit PDCP-RESET-ACK message 604 after its PDCP has been reset to the command from the eNB. However, if the PDCP-RESET message 603 is to inform the WTRU that the eNB performed a PDCP reset, then the PDCP-RESET-ACK message 604 is not mandatory.

The PDCP-RESET-ACK message may be defined using a new type of PDCP Control PDU (e.g., via a 'PDU type' field or a 'super-field (SUFI) type' field). As with the PDCP-STATUS message, the PDCP-RESET acknowledgment signaling can be demonstrated with reference to FIGS. 3A and 3B. As shown in FIG. 3A, a PDCP/RLC inter-layer polling mechanism 301 performs an internal reliability status check of the RLC layer 320 by setting a polling signal RLC-DATA-REQ 302, which may include a RB-ID, a data field and an acknowledgement request, sent from the PDCP layer 310 to the RLC layer 320. The RLC 320 sets one or more bits of a polling flag 304 on the RLC data PDU(s) carrying the PDCP-RESET message, and receives an RLC status report 305 (i.e., an RLC ACK/NACK report). The PDCP layer 310 receives the acknowledgment signal RLC-DATA-CNF 307 from the RLC 320, indicating the RB-ID and the ACK/NACK.

Alternatively, for UM RLC entities, the PDCP entity sending the PDCP-RESET may utilize a polling mechanism to obtain acknowledgement indication (e.g., a delivery notification) from the HARQ entity below the RLC, (i.e., to poll the HARQ transmission status via RLC and MAC. Or the RLC below the sending PDCP can use the RLC peer entity acknowledgement to know if the PDCP-RESET message sent has reached its destination or not. As shown in FIG. 3B, a PDCP/RLC inter-layer polling mechanism 301 performs an internal reliability status check to the RLC 320 and in turn to a MAC 330 for aHARQ 340 processor status. A polling signal RLC-DATA-REQ 302 is set by the polling mechanism 301, and sent by PDCP 310 to the RLC 320, which forwards the polling as signal MAC-DATA-REQ 303. These polling signals 302, 303 include the RB-ID, a data field and an acknowledge request. The MAC 330 sends a signal HARQ-DATA-REQ 304, as data to the HARQ processor 340. The HARQ processor 340 status is returned to the PDCP 310 via a HARQ ACK/NACK signal 305, a MAC-DATA-CNF signal 306 as an ACK/NACK, and a RLC-DATA-CNF signal 307 with the ACK/NACK and the RB-ID. While the above example implementations of PDCP-RESET message acknowledgment are described with reference to a WTRU, the signaling according to FIGS. 3A and 3B may be applied to similar respective entities in an eNB implementation.

While a PDCP reset/re-establishment has been described above in reference to an explicit PDCP-RESET message, the information related to inform or command the peer entity (eNB/WTRU) that a full or a partial PDCP reset has occurred or needs to occur may alternatively be carried or organized into an LTE information element (IE) and be carried by an RRC message.

In another embodiment, an additional type of PDCP Control PDU is utilized in a PDCP-BUFFER-STATUS message, which describes the status of the PDCP buffer at the PDCP entity. For example, the receiving PDCP entity can use the PDCP-BUFFER-STATUS message to report on the amount of data that is stored in the receive PDCP buffer (i.e. PDCP buffer occupancy), such as the number of packets (SDUs) or number of bytes utilized in the receive buffer. This information is sent from the receiving PDCP entity (WTRU/eNB) to the transmitting PDCP entity (WTRU/eNB) in a PDCP-BUFFER-STATUS message, and can be used by the transmitting PDCP entity to affect its various functions. Similarly, a PDCP-BUFFER-STATUS message may be transmitted from the transmitting PDCP entity to the receiving PDCP entity to report on the PDCP transmit buffer occupancy.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for ensuring delivery of packet data convergence protocol (PDCP) packets in a wireless communication system, the method comprising:
performing re-establishment of a PDCP entity responsive to a handover error, wherein performing re-establishment of the PDCP entity comprises resetting a header compression entity;
generating a PDCP-STATUS message based on the re-establishment of the PDCP entity, wherein the PDCP-STATUS message comprises a starting sequence number and a bitmap, wherein the starting sequence number is associated with a PDCP service data unit (SDU) that has not been successfully received by a peer entity and wherein the bitmap comprises a plurality of bits, each of the plurality of bits representing a status of a PDCP SDU, and the bitmap does not include a bit that represents a status of the PDCP SDU associated with the starting sequence number;
sending the generated PDCP-STATUS message to the peer entity in a PDCP control packet data unit (PDU); and
receiving a retransmission of the PDCP SDU associated with the starting sequence number and at least one of any other PDCP SDU based on the at least one of any other PDCP SDU being negatively acknowledged via the bitmap.

2. The method of claim 1 wherein the generating of the PDCP-STATUS message based on the re-establishment of the PDCP entity is configured by a radio resource control (RRC) signal.

3. The method of claim 1 wherein the starting sequence number comprises a count, the count including a hyperframe number (HFN) and a PDCP SDU sequence number (SN).

4. The method of claim 1 further comprising:
receiving a handover command; and
sending a subsequent PDCP-STATUS message based on the received handover command.

5. The method of claim 4 wherein the handover command is received in a radio resource control (RRC) message.

6. The method of claim 1 further comprising reporting a buffer status, wherein the buffer status is included in a PDCP control PDU.

7. The method of claim 1 wherein a first bit of the bitmap represents a status of a PDCP SDU with a SN that is a next consecutive PDCP SDU following the PDCP SDU associated with the starting sequence number.

8. A Wireless Transmit/Receive Unit (WTRU) comprising:
a transmitter;
a receiver; and
a processor communicatively coupled with the transmitter and the receiver, the processor configured to:
perform re-establishment of a packet data convergence protocol (PDCP) entity responsive to a handover error, wherein the performing re-establishment of the PDCP entity comprises resetting a header compression entity; and
generate a PDCP-STATUS message based on the re-establishment of the PDCP entity, wherein the PDCP-STATUS message comprises a starting sequence number and a bitmap, wherein the starting sequence number associated with a PDCP service data unit (SDU) that has not been successfully received by a peer device and wherein the bitmap comprises a plurality of bits, each of the plurality of bits representing a status of a PDCP SDU, and the bitmap does not include a bit that represents a status of the PDCP SDU associated with the starting sequence number;
the transmitter configured to send the PDCP-STATUS message to the peer device in a PDCP control packet data unit (PDU); and
the receiver configured to receive a retransmission of the PDCP SDU associated with the starting sequence number and at least one of any other PDCP SDU based on the at least one of any other PDCP SDU being negatively acknowledged via the bitmap.

9. The WTRU of claim 8 wherein the generating of the PDCP-STATUS message based on the re-establishment of the PDCP entity is configured by a radio resource control (RRC) signal.

10. The WTRU of claim 8 wherein:
the receiver is configured to receive a handover command; and
the transmitter is configured to send a subsequent PDCP-STATUS message based on the received handover command.

11. The WTRU of claim 10 wherein the handover command is received in a radio resource control (RRC) message.

12. The WTRU of claim 8 wherein the starting sequence number comprises a count, the count including a hyperframe number (HFN) and a PDCP SDU sequence number (SN).

13. The WTRU of claim 8 wherein the processor is further configured to report a buffer status, wherein the buffer status is included in a PDCP control PDU.

14. The WTRU of claim 8 wherein a first bit of the bitmap represents a status of a PDCP SDU with a SN that is a next consecutive PDCP SDU following the PDCP SDU associated with the starting sequence number.

15. A Wireless Transmit/Receive Unit (WTRU) comprising:
a transmitter;
a receiver; and
a processor communicatively coupled with the transmitter and the receiver, the processor configured to perform re-establishment of a packet data convergence protocol (PDCP) entity responsive to a handover error, wherein performing re-establishment of the PDCP entity comprises resetting a header compression entity;

the receiver configured to receive a PDCP-STATUS message from a peer device, wherein the PDCP-STATUS message comprises a starting sequence number and a bitmap, wherein the starting sequence number is associated with a PDCP service data unit (SDU) that has not been successfully received by the peer device, and wherein the bitmap comprises a plurality of bits, each of the plurality of bits representing a status of a PDCP SDU, and the bitmap does not include a bit that represents a status of the PDCP SDU associated with the starting sequence number; and the transmitter configured to retransmit the PDCP SDU associated with the starting sequence number and at least one of any other PDCP SDU based on the at least one of any other PDCP SDU being negatively acknowledged via the bitmap.

16. The WTRU of claim 15 wherein the processor is further configured to manage a PDCP SDU buffer based on the received PDCP-STATUS message, wherein the processor is configured to manage the PDCP SDU buffer by removing one or more PDCP SDUs from the PDCP SDU buffer.

17. The WTRU of claim 15 wherein the processor is further configured to report a buffer status wherein the buffer status is included in a PDCP control protocol data unit (PDU).

18. The WTRU of claim 15 wherein a first bitmap represents a status of a PDCP SDU with a SN that is a next consecutive PDCP SDU SN following the PDCP SDU associated with the starting sequence number.

19. The WTRU of claim 15 wherein the receiver is further configured to receive a radio resource control (RRC) handover command, and the transmitter is further configured to transmit a second PDCP-STATUS message based on receiving the RRC handover command.

* * * * *